United States Patent Office 3,801,620
Patented Apr. 2, 1974

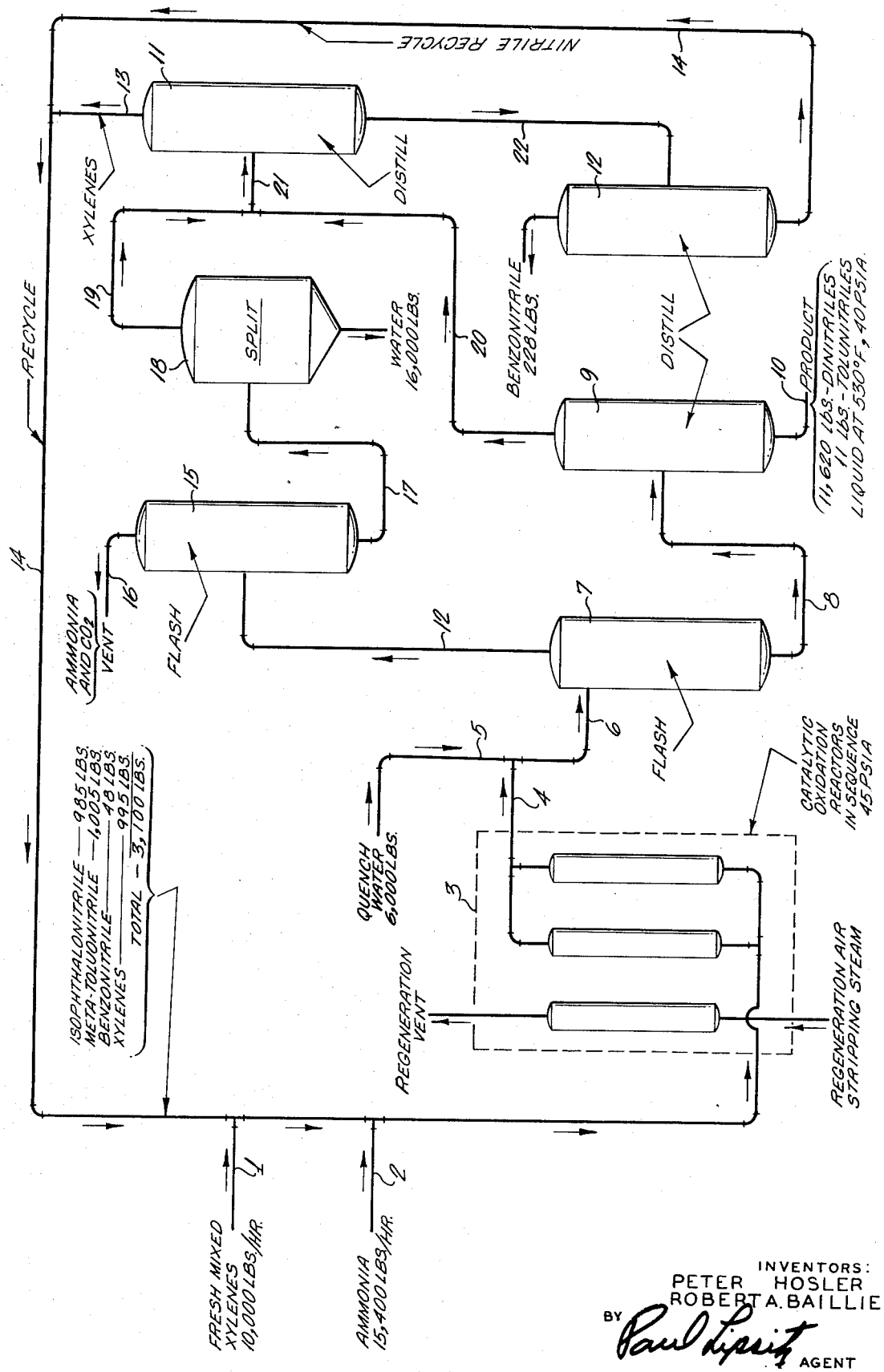

3,801,620
SEPARATION OF LIQUID ISOPHTHALONITRILE
Peter Hosler, Wallingford, and Robert A. Baillie, West Chester, Pa., assignors to Sun Research and Development Co., Philadelphia, Pa.
Filed Aug. 23, 1971, Ser. No. 173,810
Int. Cl. C07c *121/54*
U.S. Cl. 260—465 C        2 Claims

ABSTRACT OF THE DISCLOSURE

In the vapor phase ammoxidation of m-xylene to isophthalonitrile, the improvement which comprises cooling the gaseous products from the ammoxidation reactor to temperature and pressure conditions which will maintain said isophthalonitrile in the liquid phase, separating volatiles from said liquid isophthalonitrile, and recovering highly purified liquid isophthalonitrile as bottoms.

---

The ammonoxidation of m-xylene to isophthalonitrile is a well-known reaction described in the lierature and in numerous patents. In typical vapor phase ammoxidation procedures, the gaseous effluent from the ammoxidation reactor is coled by heat exchange, and the cooled gases quenched with water to produce an aqueous slurry of the water insoluble isophthalic acid. This product is then filtered, washed, recovered, and often remelted for further purification by distillation (see U.S. 3,462,476, J. P. O'Donnell et al., issued Aug. 19, 1969). An alternate procedure for recovery and purification of isophthalonitrile is to use an organic solvent system from which the isophthalonitrile is subsequently crystallized, filtered, washed, and otherwise purified.

An improved process for recovering isophthalonitrile from the ammoxidation of m-xylene is now provided which offers a highly efficient and economical method and avoids the difficulties inherent in solids handling procedures. Thus, filtering and washing steps are avoid which, in turn, reduces both operational difficulties and capital investment for equipment. Furthermore, the process of the invention provides isophthalonitrile in liquid form which is a highly preferred form for further use in processing it to items of commerce; e.g. hydrolysis to isophthalic acid.

In accord with the invention, an improved process step in the vapor phase ammoxidation of m-xylene to isophthalonitrile is provided which comprises condensing thet gaseous products from the ammoxidation reactor to the liquid state, separating volatiles, and recovering isophthalonitrile at bottoms.

The process of this invention is applicable to any vapor phase ammoxidation of m-xylene and this will include those ammoxidation procedures with an without oxygen and with any of the numerous catalysts useful in such processes. Also, the vapor phase ammoxidation may be carried out in a fixed bed, moving bed, fluidized bed or other type of reaction means for obtaining contact of the reactant vapors with the catalyst. Examples of typical ammoxidation procedures are set forth in U.S. 3,478,082 (Huibers, issued Nov. 11, 1969), U.S. 3,079,422 (Pasky, issued Feb. 26, 1963), and U.S. 3,501,517 (Hughes et al., issued Mar. 17, 1970).

It will also be understood that the quality of the m-xylene reactant fed into the ammoxidation process will vary and will depend upon its source, but in general the m-xylene used will be about 80% to about 98% pure. The impurities in the feed m-xylene will be predominantly the ortho and para isomers of xylene, ethylbenzene, toluene, and the like. During ammoxidation, not all of the xylenes are converted to nitrile, and conversion of only one alkyl group may occur so that the effluent contains unreacted xylene, mono-nitrile (e.g. toluonitrile, and benzonitrile), and the like. It is these unreacted xylenes, unwanted nitriles, water of reaction and unreacted ammonia which are efficiently removed by the process of this invention to yield high purity isophthalonitrile.

In carrying out the process of the invention the gaseous effluent from the ammoxidation reactor will be cooled from its exiting temperature in order that the isophthalonitrile will condense to the liquid phase and this will require that the temperature of the effluent be reduced to a temperature of about 280° F. to about 460° F., preferably about 325° to about 375° F. It will be understood that any type of heat exchange device or method may be used, preferable techniques including a water quench system, and standard heat exchangers. The cooled liquid, which is in essential equilibrium with a vapor phase comprised of the unwanted materials, is then subjected to one or more separation procedures. Preferably the liquid held at about 350° F. will be subjected to a first separation by flashing at about 40 p.s.i.a to remove the more volatile materials such as water, ammonia, xylene, etc., and this will be followed by a standard distillation at about 450° to 550° F. at a pressure of about 15 to 40 p.s.i.a to remove almost all of the impurities overhead. By operating in this manner, the remaining still bottoms consist of high purity (over 98%) isophthalonitrile.

In order to further describe the invention reference is now made to the following examples.

EXAMPLE 1

The drawing and the following description serve to examplify the process.

A xylene mixture, consisting of 95% m-xylene, 1.6% o-xylene, 0.9% p-xylene and 2.4% ethylbenzene is charged through line 1 to an ammoxidation reactor 3 at the rate of 10,000 lb./hr. Substantially anhydrous ammonia, 15,400 lb./hr. (line 2), and the recycle stream 14 are simultaneously charged to the reactor, after preheating to 750° F. The reactor contains a catalyst of vanadia, either pure or held on an inert support, such as alumina. The reactor is operated cyclicly, so that the vandia serves alternately as an oxygen donor for the ammoxidation cycle, and then the reduced vanadia is re-oxidized in a separate cycle with oxygen-containing gas. The figure illustrates the reactor 3 to be of the fixed-bed type, where the reaction columns are alternated from ammoxidation stream to re-oxidation, on a cyclic basis. The reaction product stream 4, 28,700 lb./hr., contains 3.8 wt. percent xylenes, 1.0% benzonitrile, 3.7% toluonitrile, 44.0% phthalonitriles, .3% carbon dioxide, 34.8% water, and 12.4% ammonia. To this stream, which is at 750° F., is added through line 5 approximately 6,000 lb. of water per hour and the combined stream 6 is passed to a flash tower 7 at the resulting temperature of 350° F., 40 p.s.i.a. Liquid isophthalonitrile (IPN) is withdrawn from the bottom of the flash tower through line 8 at the rate of 12,840 lb./hr., with the following composition: 0.6 wt. percent xylenes, 0.7% benzonitrile, 3.8% toluonitriles, and 95.0% phthalonitriles. Liquid IPN in line 8 is purified in distillation column 9 to give a dinitrile product 10 with a purity of 99.9%.

As can be seen from the drawing, the overhead from flash tower 7 is taken through line 12 to flash tower 15 held at 100° F. and 40 p.s.i.a., where ammonia and $CO_2$ are taken overhead through line 16. The water bottoms are then passed through line 17 to a still 18 where the hydrocarbons are split off in the overhead 19 and combined with the hydrocarbon overhead 20 from distillation column 9. This combined stream 21 enters still 11, the overhead xylene in line 13 being recycled and the bottoms passed through line 22 to still 12 where benzonitrile is taken overhead. The nitrile bottoms from still 12 (predominantly toluonitrile) are taken through line 14 for recycle to the ammoxidation reactor 3.

Details of these distillations are:

| Column | Temp., °F. OVHD | Temp., °F. Btms. | Stages | Reflux ratio | Pressure, p.s.i.a. |
|---|---|---|---|---|---|
| 9 | 518 | 531 | 15 | 20 | 40 |
| 11 | 363 | 500 | 8 | 3 | 40 |
| 12 | 442 | 514 | 13 | 10 | 40 |

EXAMPLE 2

An ammoxidation reaction is conducted as described in Example 1, but reaction stream 6 is cooled indirectly with a heat exchanger to 360° F., 40 p.s.i.a., before passing to the flash tower. The composition of the liquid IPN from the bottom of the flash tower is: 0.7 wt. percent xylenes, 0.6% benzonitrile, 4.1% toluonitriles, and 94.5% phthalonitriles. The remainder of the purification and recycle scheme is similar to that given in Example 1.

EXAMPLE 3

An ammoxidation reactor is conducted as described in Example 1, except that 5,400 pounds of steam per hour is added with the fresh xylenes, recycle and ammonia, to the reactor charge. The product stream, at 750° F., was cooled with approximately 6,600 lb. water per hour to give 340° F. in the flash tower. The liquid IPN product from the bottom of the flash tower had the following composition: 0.5 wt. percent xylenes, 0.5% benzonitrile, 3.3% toluonitriles, 95.6% phthalonitriles. The remainder of the purification and recycle scheme is similar to that given in Example 1.

The invention claimed is:

1. In the vapor phase ammoxidation process for conversion of m-xylene to isophthalonitrile, the improvement which comprises cooling the gaseous products from the ammoxidation reactor by a water quench to a temperature of about 350° F., at a pressure of about 40 p.s.i.a. in order to maintain said isophthalonitrile product as a liquid, flashing off water, ammonia, volatile by-products, and unreacted xylene at about 350° F. at 40 p.s.i.a., withdrawing isophthalonitrile product as bottoms, distilling off remaining impurities at about 500° F. to about 540° F., at about 40 p.s.i.a. and withdrawing highly purified liquid isophthalonitrile from the still bottom.

2. In the vapor phase ammoxidation process for conversion of m-xylene to isophthalonitrile, the improvement which comprises cooling the gaseous products from the ammoxidation reactor by a water quench to a temperature of from about 280° F. to about 460° F., at a pressure of from about 15 to about 40 p.s.i.a. in order to maintain said isophthalonitrile product as a liquid, flashing off water, ammonia, volatile by-products, and unreacted xylene at about 325° F. to 375° F. at 40 p.s.i.a., withdrawing isophthalonitrile product as bottoms, distilling off remaining impurities at about 450° F. to about 550° F. at about 15 to 40 p.s.i.a., and withdrawing highly purified liquid isophthalonitrile from the still bottom.

References Cited

UNITED STATES PATENTS 3,472,891  10/1969  Ikeda et al. _____ 260—465
3,206,378  9/1965  Teramoto et al. ____ 260—465 X LEWIS GOTTS, Primary Examiner D. H. TORRENCE, Assistant Examiner U.S. Cl. X.R.

260—465 H